(12) United States Patent
Merabet

(10) Patent No.: US 6,294,215 B1
(45) Date of Patent: Sep. 25, 2001

(54) METHOD FOR RECONSTITUTING A FROZEN PRODUCT WITH MICROWAVES

(75) Inventor: Mustapha Merabet, Blonay (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/679,361

(22) Filed: Oct. 5, 2000

(30) Foreign Application Priority Data

Oct. 7, 1999 (EP) .................................................. 99203289

(51) Int. Cl.⁷ ................................. A23G 9/00; A23L 1/00
(52) U.S. Cl. .......................... 426/524; 426/241; 426/565
(58) Field of Search .................................... 426/524, 565, 426/515, 241

(56) References Cited

U.S. PATENT DOCUMENTS

| | | | |
|---|---|---|---|
| 3,503,757 | * 3/1970 | Rubenstein | 426/565 |
| 4,428,971 | 1/1984 | Havette et al. | 426/565 |
| 4,738,862 | 4/1988 | Bee | 426/565 |
| 4,891,235 | 1/1990 | Mizuguchi et al. | 426/281 |
| 5,229,157 | 7/1993 | Birch et al. | 426/564 |
| 5,624,700 | 4/1997 | Ogden | 426/564 |
| 5,968,582 | * 10/1999 | Vaghela et al. | 426/524 |

FOREIGN PATENT DOCUMENTS

| | | |
|---|---|---|
| 1005399 | 9/1965 | (GB) . |
| 59-146542 A1 | 8/1984 | (JP) . |
| 6-062754 | 3/1994 | (JP) . |

* cited by examiner

Primary Examiner—George C. Yeung
(74) Attorney, Agent, or Firm—Winston & Strawn

(57) ABSTRACT

The invention relates to a method for producing a frozen food product having enhanced coupling properties with microwaves. The method involves providing a non-frozen food product, adding to the non-frozen food product an amount of carbon dioxide in the form of dry-ice, and freezing the food product containing the carbon dioxide to provide a frozen food product and allowing the carbon dioxide to sublime to form gas bubbles distributed within the frozen food product. The invention also relates to a frozen food product prepared by the method of the invention.

15 Claims, No Drawings

METHOD FOR RECONSTITUTING A FROZEN PRODUCT WITH MICROWAVES

FIELD OF THE INVENTION

The invention relates to improvements in the microwave heating of frozen food products. In particular, the invention relates to a method for preparing frozen food products having enhanced coupling properties with microwaves such that the reconstitution time can be significantly reduced. The invention also relates to a frozen food product having such properties.

BACKGROUND OF THE INVENTION

Microwave heating of frozen food products is characterized by a slow and largely non-uniform reheating first step before the product is thawed, followed by a more rapid second step wherein the thawed parts of the product are heated. In fact, the non-uniformity of the heating before the thawing is translated and even amplified during the second heating step. Therefore, there is a need to focus on the frozen state and to modify the physical properties of the frozen product in order to increase the rate of thawing and to reduce the temperature gradients between the various parts of the food product during the first microwave heating step.

It has been found that frozen foods have very low dielectric parameters at the microwave heating frequency of 2.45 GHz, ranging from 1.1 to 2.5 for the real part of the permittivity, $\epsilon'$, and from 0.01 to 0.0001 for the imaginary part, $\epsilon''$ (microwave absorption). These values are both close to those of gases and air at ambient conditions. The microwave heating rate that is induced by dipolar absorption is proportional to the microwave absorption $\epsilon''$, and therefore is very small for all frozen products. In addition, because of the low values for the dielectric parameters, the impedance of the whole frozen product does not affect the microwave field distribution in the oven cavity, resulting in a heating pattern that is largely non-uniform.

U.S. Pat. No. 4,428,971 to Havette et al. discloses a process for the preparation of a composition for frozen or deep-frozen soufflés. The patent relates to the incorporation of carbon dioxide in the proportion of 0.5 to 2% by weight of the souffle in order to promote better rising during baking in a conventional oven and to reduce the likelihood of the soufflé's collapsing when served. According to Havette, a small amount of carbon dioxide is fully dissolved into the soufflé base which is then stored in a freezer. The dissolution of the carbon dioxide is achieved by injecting carbon dioxide gas into the product or by mixing solid carbon dioxide with the soufflé recipe until complete dissolution of the gas is achieved. In both cases, the product obtained after this processing step is a "batter" with some gas dissolved in it. Macroscopically, this carbon dioxide gas does not form gas pockets in the "batter" because of the small quantity of solid carbon dioxide used and because of the way it is incorporated into the composition. In Havette, the carbon dioxide is mixed in small amounts at low speed until the gas has completely dissolved. When the frozen composition is reheated by baking, the dissolved gas expands so that the whole upper part of the soufflé rises and does not collapse when it is served. The method of cooking a souffle disclosed by Havette is adapted to conventional ovens, however, and would not be suited to microwave heating. The process of Havette does not utilize a structure which is microscopically modified so as to provide significant improvements for microwave heating.

U.S. Pat. No. 5,624,700 to Ogden discloses the incorporation of relatively large amounts of carbon dioxide in solid or semi-solid foods during the final processing steps for making a semi-solid or solid spoonable food. The food products as manufactured, however, are carbonated cream or ice cream products which are not intended to be processed in microwave ovens.

GB Patent No. 1,005,399 to American Machine and Foundry Company discloses a method of enhancing the flavor of a dairy dessert by introducing carbon dioxide into the dessert to lower the initial pH value of the mixture and provide a dessert having greater zest through carbonation.

JP 59146542 A1 to Sawaguchi Kazuore discloses a mixture for making carbonated ice cream, sherbet, or frozen yogurt.

JP 6062754 A to Kanebo Ltd relates to the production of carbonated ice candy.

Despite these disclosures, there remains a need for improved microwave reheatable frozen products, and the present invention satisfies this need.

SUMMARY OF THE INVENTION

The present invention relates to the preparation of a frozen food product having enhanced coupling properties with microwaves. In a preferred embodiment of the invention an amount of solid carbon dioxide at an initial temperature is added to a non-frozen food product, the solid carbon dioxide containing food product is frozen to a storage temperature, and the solid carbon dioxide is allowed to sublime and form gas bubbles to provide a frozen food product wherein the gas bubbles are distributed within the frozen food product and are of sufficient size to induce a more rapid and uniform absorption of microwave energy by the frozen food product. The difference between the initial temperature of the solid carbon dioxide and the storage temperature is typically from about 35 to 60° C., and preferably from about 35 to 50° C. The amount of solid carbon dioxide is typically at least about 3 percent by weight of the non-frozen food product.

According to one embodiment of the invention, the solid carbon dioxide is added to the food product as finely ground particles having an average size of from about 1 to 4 mm or preferably from about 2 to 3 mm. According to another embodiment of the invention, the majority of the gas bubbles that are formed have a size of at least 1 mm, and the sublimation of carbon dioxide results in less than 10 percent of the carbon dioxide escaping from the food product. The solid carbon dioxide containing food product is frozen to the storage temperature in less than 5 minutes. In another embodiment of the invention, the solid carbon dioxide containing food product is frozen first to a temperature lower than the storage temperature, preferably between about −45 to −39° C., and then slowly the temperature is increased over a period of time of at least about 25 minutes to the storage temperature, which is preferably between about −21 and −18° C.

The invention also relates to a frozen food product comprising an amount of carbon dioxide of at least 3 percent by weight of the food product in the form of gas bubbles wherein the majority of the gas bubbles have a size of at least 1 mm, wherein the amount of carbon dioxide is between about 3 to 6 percent by weight of the food product. This enables the frozen food product to be reheated in a microwave at least 30 percent more quickly than a frozen food product without carbon dioxide.

DETAILED DESCRIPTION OF THE INVENTION

The present invention provides an improved method for microwave heating of food products. The method improves microwave heating by promoting the dipolar absorption of microwaves in the frozen food products. Typically, promoting dipolar absorption is not possible without major changes in the recipe. The present invention, however, promotes dipolar absorption in the food produce without substantially changing the recipe. The invention improves microwave heating by promoting the interaction of microwave fields with the surfaces of gas bubbles that are entrapped within the frozen food matrix. This is sufficient to initiate microwave heating of the frozen products. More particularly, the invention adds carbon dioxide to the frozen food product in solid form, i.e., as dry ice, and uses the sublimation property of carbon dioxide to produce a gas entrapped within the frozen food product.

The generally compact and dense frozen food product is transformed into a porous frozen food product which modifies the mode of interactions between the impinging microwaves and the internal surface of the gas bubbles. The presence of the gas holes or bubbles distributed within the product also promotes the deposition and absorption of the microwave energy throughout the whole product, reducing the temperature gradients between the various parts of the product and also the time needed to bring the product to its thawed state. The presence of the gas bubbles induces a more uniform absorption of microwave energy by the food product. A more rapid and uniform absorption of microwave energy means that the heating time is reduced by about 20%, preferably about 26%, and more preferably about 30% compared to a food product without added solid carbon dioxide. More uniform heating means that the standard deviation of the temperature distribution of the product top surface as indicated by infrared thermograms, is reduced by at least 30%.

Furthermore, it has surprisingly been found that a substantially fine and uniformly distributed porous structure having enhanced coupling properties with microwaves can be obtained when the temperature difference between the initial temperature of the carbon dioxide, i.e. the temperature when the $CO_2$ is added to the food product, and the final temperature of the frozen food product at storage is in a range of about 35 to 60° C., preferably in the range of about 35 to 50° C., and more preferably about 42° C. It is the temperature difference between the initial and the final state of the carbon dioxide that drives the sublimation process. When the temperature gradient is within the desired range the sublimation of solid carbon dioxide particles results in gas bubbles forming within the frozen food structure. Larger temperature gradients, which are intuitively achieved by normal processing, result in the gas escaping and leaving large cracks and/or openings in the frozen food structure. Such large cracks and/or openings are undesirable and result in an unappetizing food product.

In order to obtain the proper temperature gradient so that the carbon dioxide sublimes slowly within the frozen food product, it is necessary to maintain the frozen carbon dioxide at a temperature of from about −80 to −55° C., preferably from about −70 to −60° C., more preferably about −62° C. in a tank, and at a pressure of from about 1 to 4 bars, preferably from about 2 to 3 bars, more preferably about 2.3 bars, and to rapidly freeze the food with the carbon dioxide to a storage temperature of between about −30 to −15° C., preferably about −21 to −18° C., and more preferably about −20° C. Rapidly freezing the food is means that the food is frozen to the storage temperature in less than 15 minutes, preferably less than 10 minutes, more preferably less than 5 minutes. It is noted that carbon dioxide usually freezes at −78° C. which, if sublimation is carried out at ambient temperature of +18° C., leads to a gradient of 96° C. Sublimation at ambient is not satisfactory since the gas escapes from the food product and a porous structure is not obtained.

In a preferred embodiment of the invention, the freezing comprises lowering the food product to a temperature lower than the storage temperature of the frozen food product, and then slowly increasing the temperature to the storage temperature.

More preferably, the freezing comprises lowering the non-frozen food product to a starting temperature lower than the storage temperature, typically between about −45 to −39° C., then slowly increasing to a temperature of storage of between about −21 to −18° C. By slowly increasing the temperature is meant that the food product is warmed from the starting temperature to the storage temperature over a time of at least 25 minutes, preferably at least 35 minutes, and more preferably at least 40 minutes. By first decreasing the temperature of the food product to a temperature below −39° C., the food matrix freezes more rapidly and consequently sublimation of the dry ice is slowed down so that the desired size of gas bubbles are obtained and the gas bubbles are evenly distributed throughout the product. The desired size and distribution of gas bubbles are not obtained when the carbonated food product is simply placed in a conventional freezer at about −20° C. If the carbonated food product is merely placed in a freezer at about −20° C. the freezing time is too long, and a reduced amount of bubbles form and a significant amount of gas escapes before the food product is sufficiently hardened.

In an alternative embodiment the food product is rapidly frozen to the storage temperature of the food product after addition of the carbon dioxide. Preferably the freezing time is reduced to about 1 to 5 minutes. Industrial cooling means are typically used to obtain low freezing times. Suitable industrial cooling means include, but are not limited to, air forced cooling or cryogenic cooling. For instance, air-forced cooling can use a tunnel freezer in which cold air is forcibly circulated over the products. Cryogenic cooling can use cryogenic freezers in which liquid nitrogen is used as the refrigerant and is sprayed on the products in the freezing cavity so as to allow for very rapid freezing of food products.

In a preferred embodiment of the invention, carbon dioxide is added in dry-ice form in an amount of at least about 1% by weight of the food product, preferably at least about 3%, and more preferably at least about 5% by weight of the food product. A sufficient amount of carbon dioxide is necessary to generate clearly distinct gas bubbles in the food matrix after freezing. We found that below this limit, the carbon dioxide had a tendency to dissolve into the food matrix and not form an even porous pattern.

The upper limit for the amount of dry-ice particles to be incorporated into the products is dictated by the acceptability of the appearance of the food product which has a tendency to expand with the addition of gas. For typical food product such as lasagne, the upper limit is about 6% by weight of dry-ice for which relatively small but still acceptable expansion of the products is noticed. Obviously, larger amounts of dry-ice incorporated in products would result in larger volumetric expansion, and the criteria of acceptability would depend on the product type.

Preferably, carbon dioxide is added to the food product in the form of finely ground dry-ice particles having an average size of about 1 to 4 mm, preferably of about 2 to 3 mm. Sublimation of larger sized particles results in relatively large gas pockets within the food product which are not suitable for good microwave coupling.

The size of the gas bubble should be at least about 1 millimeter, preferably at least about 2 mm, and more preferably at least about 5 mm in order to induce a substantial effect on the microwave heating regime of the frozen product. The 1 mm size is considered as the minimum size for positively affecting the coupling between microwaves and product. The maximum size for the gas bubbles is about 7.6 mm. The size of the gas bubbles, however, may vary depending upon the nature of the food product. In particular, some ingredients, such as hydrocolloids, or physical properties, such as low pH, induce the formation of large bubbles even when the volume fraction of gas in the product is low. Conversely, others, such as food products containing significant amounts of salts, will induce smaller bubbles.

Most of the added $CO_2$ is retained by the frozen product because $CO_2$ is much heavier than air (the molecular weight of $CO_2$ is approximately 44 g/mol, compared to approximately 14 g/mol for nitrogen which is the main constituent of air). As the dry-ice particles are very quickly embedded into the food matrix, there is only limited loss of $CO_2$ by diffusion in air, provided the sublimation process is controlled as described herein. In such case, the loss is generally less than about 10%, preferably less than about 5%, and more preferably less than about 1%.

The method is suitable for treating any type of food product that is reheated in a microwave oven before serving. The food product is typically a raw or cooked frozen product. Food products that are particularly suited to the method of the invention are filled pastas, pasta and sauces, prepared dishes, snacks, pizzas, and mashed vegetables or grains. In order to preserve the intrinsic texture of the food product and to not alter its appearance and structure, the carbon dioxide is mixed with the flowable part of the product. For instance, for filled pasta, the dry-ice is mixed with the filling which usually comprises sauce with meat, vegetables, and/or spices. Preferably the dry ice is substantially evenly distributed throughout the food product.

EXAMPLES

The invention is further defined by reference to the following examples describing in detail the method of the present invention. The examples are representative, and they should not be construed to limit the scope of the invention. All percentages and parts are by weight, unless otherwise indicated.

Example 1

A frozen food product was prepared according to the method of the invention by following the steps itemized below:
1. Blocks of solid carbon dioxide are finely ground in a mill to provide particles having an average size of about 2 to 3 mm.
2. The dry-ice particles are stored in a special tank wherein the internal pressure is maintained at about 2 bars and the temperature is maintained at about −62° C., so that the particles do not stick to each other and do not evaporate.
3. 1-kilogram of lasagne with Bolognaise sauce is provided as the food product (3–4 portions). The Bolognaise sauce is thoroughly and quickly mixed with about 3 to 6% by weight of the dry-ice particles in a blender of the helical-type with 3 blades and jacketed for a maximal pressure of 5 bars at ambient temperature and then allowed to expand for slightly less than 1 minute.
4. The whole mixture is then poured between each pasta layer to form the lasagne structure in a tray and quickly placed in a freezer at −40° C. for about 2 to 3 hours before raising the temperature of the freezer to the final frozen storage temperature of −20° C., allowing the dry-ice particles to slowly sublime as the surrounding food matrix starts to freeze.
5. After at least 2 days of frozen storage, the frozen lasagne is ready to be reconstituted in a microwave oven. The reconstitution process is accomplished in a shorter time and with improved uniformity as compared to a standard non-treated lasagne product.

Example 2

1.34 Kg of a preparation comprising macaroni and cheese was prepared in accordance with operations 1 to 5 of Example 1, except that each of the two components, macaroni and cheese, were thoroughly mixed with 3 to 6% by weight of the dry-ice particles.

Example 3

Micro wave reheating trials were performed in a side-fed energy and turntable type microwave oven (Panasonic Genius NN-6858 delivering a power output of 720 Watts). Tests were carried out for the lasagne of Example 1 for a reheating time of 30 minutes and compared to a non-treated lasagne product.

The results for the pertinent microwave heating parameters are given in table 1 below.

TABLE 1

|  | $\Delta T_m/\Delta t$ (° C./min) | σ | $T_L$ (° C.) |
|---|---|---|---|
| Comparative |  |  |  |
| Non treated Lasagne | 3.03 | 8.3 | 41.5 |
| Invention |  |  |  |
| Lasagne with 3 wt. % dry-ice | 3.63 | 7.1 | 56.4 |
| Lasagne with 6 wt. % dry-ice | 3.91 | 5.8 | 62.7 |

The apparent mean heating rate is termed "AHR" and expressed as $\Delta T_m/\Delta t$ where $\Delta T_m = T_m - T_i$. $T_m$ is the mean temperature on top surface of the product as deduced from a thermogram; Ti is the storage temperature which, in the present case, is −20° C.; and Δt is the heating time (30 minutes). The thermogram is performed using an infrared camera to measure the overall heat distribution on the top surface of the product.

σ is the standard deviation of the temperature distribution in the thermograms of the top surface of the food product. The lower the value of σ, the more uniform the temperature on the top surface of the product.

$T_L$ is the lowest temperature of the product measured after the 30-minute heating time using fiber-optic probes which are located about 1.5 cm beneath the center of the coldest surface area as detected on the thermogram.

As shown by Table 1, the AHR is improved by about 29% and the standard deviation substantially reduced by incorporating dry-ice particles into the lasagne in an amount of 6%, compared to the original product. The complete reheating process is completed in about 26 to 28 minutes if dry-ice particles are incorporated into the lasagne in an amount of 6%.

Example 4

Similar tests were carried out in the ovens for the macaroni and cheese product of Example 2. The reheating time was 25 minutes. The product of the invention was compared to a non-treated macaroni and cheese product.

The results for the pertinent microwave heating parameters are given in table 2 below.

TABLE 2

|  | $\Delta T_m/\Delta t$ (° C./min) | $\sigma$ | $T_L$ (° C.) |
|---|---|---|---|
| Comparative | | | |
| Non treated Mac & Cheese | 3.51 | 4.1 | 54.5 |
| Invention | | | |
| Mac & Cheese with 3 wt. % dry-ice | 4.04 | 3.2 | 64 |
| Mac & Cheese with 6 wt. % dry-ice | 4.78 | 3.8 | 70.2 |

The AHR is improved by about 36% by adding dry ice particles in an amount of 6% by weight of the product. This corresponds to a reduction of about 29% in the reconstitution time. Reheating is fully achieved in about 18 to 20 minutes if dry ice is used in an amount of about 6% by weight. A substantial evening-out of the temperature profile at the surface of the reheated products was further noted.

Incorporating a maximum of 6% by weight of dry-ice into the food product does not alter the sensorial attributes, such as flavor and taste, of the product nor does it effect the safety of heating the product in a microwave oven.

While the invention has been illustratively described herein with reference to specific aspects, features and embodiments, it will be appreciated that the utility and scope of the invention is not thus limited and that the invention may readily embrace other and differing variations, modifications and other embodiments. The invention therefore is intended to be broadly interpreted and construed, as comprehending all such variations, modifications and alternative embodiments, within the spirit and scope of the ensuing claims.

What is claimed is:

1. A method for preparing a frozen food product having enhanced coupling properties with microwaves comprising:

adding to a non-frozen food product an amount of solid carbon dioxide at an initial temperature to provide a solid carbon dioxide containing food product;

freezing the solid carbon dioxide containing food product to a storage temperature; and allowing the solid carbon dioxide to sublime and form gas bubbles to provide a frozen food product wherein the gas bubbles are distributed within the frozen food product, wherein the gas bubbles are of sufficient size to induce a more rapid and uniform absorption of microwave energy by the frozen food product.

2. The method of claim 1, wherein the difference between the initial temperature of the solid carbon dioxide and the storage temperature is between about 35 to 60° C.

3. The method of claim 2, wherein the difference between the initial temperature of the solid carbon dioxide and the storage temperature is between about 35 to 50° C.

4. The method of claim 1, wherein the amount of solid carbon dioxide is at least about 3 percent by weight of the non-frozen food product.

5. The method of claim 1, wherein the solid carbon dioxide is added as finely ground particles having an average size of about 1 to 4 mm.

6. The method of claim 5, wherein the solid carbon dioxide is added as finely ground particles having an average size of about 2 to 3 mm.

7. The method of claim 1, wherein the majority of the gas bubbles have a size of at least 1 mm.

8. The method of claim 1, wherein the solid carbon dioxide containing food product is frozen to the storage temperature in less than 5 minutes.

9. The method of claim 1, wherein freezing the solid carbon dioxide containing food product comprises lowering the temperature of the solid carbon dioxide containing food product to a temperature lower than the storage temperature and then slowly increasing the temperature to the storage temperature.

10. The method of claim 1, wherein sublimation of the carbon dioxide results in less than 10 percent of the carbon dioxide escaping from the food product.

11. The method of claim 1, wherein freezing the solid carbon dioxide containing food product comprises lowering the temperature of the solid carbon dioxide containing food product to a starting temperature of between about −45 to −39° C. and then slowly increasing the temperature of the solid carbon dioxide containing food product to a storage temperature of between about −21 and −18° C.

12. The method of claim 11, wherein the temperature of the solid carbon dioxide containing food product is increased from the starting temperature to the storage temperature over a period of time of at least about 25 minutes.

13. A frozen food product having enhanced coupling properties with microwaves comprising an amount of carbon dioxide of at least 3 percent by weight of the food product in the form of gas bubbles wherein the majority of the gas bubbles have a size of at least 1 mm wherein the gas bubbles are distributed within the frozen food product.

14. The frozen food product of claim 13, wherein the amount of carbon dioxide is between about 3 to 6 percent by weight of the food product.

15. The frozen food product of claim 13, wherein the frozen food product reheats in a microwave oven at least 30 percent more quickly than a frozen food product without carbon dioxide.

* * * * *